(12) United States Patent
Cho et al.

(10) Patent No.: US 7,518,887 B2
(45) Date of Patent: Apr. 14, 2009

(54) APPARATUS AND METHOD FOR GENERATING HIGH VOLTAGE BASED ON DIGITAL CONTROL

(75) Inventors: Jun-seok Cho, Gwangmyeong-si (KR); Young-min Chae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 336 days.

(21) Appl. No.: 11/430,846

(22) Filed: May 10, 2006

(65) Prior Publication Data

US 2007/0016335 A1    Jan. 18, 2007

(30) Foreign Application Priority Data

Jul. 14, 2005    (KR) .................. 10-2005-0063790

(51) Int. Cl.
*H02M 7/523*    (2006.01)
(52) U.S. Cl. .................. 363/21.05; 363/21.02; 399/88
(58) Field of Classification Search .................. 399/88; 363/21.02, 21.03, 21.05, 21.11, 21.04, 21.13; 323/283, 241, 300, 319, 322
See application file for complete search history.

(56) References Cited

U.S. PATENT DOCUMENTS

| | | | | |
|---|---|---|---|---|
| 5,399,964 A | * | 3/1995 | Zoller | 324/103 P |
| 5,519,311 A | * | 5/1996 | Widmayer | 323/319 |
| 5,991,171 A | * | 11/1999 | Cheng | 363/21.03 |
| 6,603,498 B1 | * | 8/2003 | Konnunaho et al. | 347/236 |
| 2004/0000897 A1 | * | 1/2004 | Asayama | 323/283 |

FOREIGN PATENT DOCUMENTS

| | | |
|---|---|---|
| JP | 2001-260466 | 10/1989 |
| JP | 2002-174970 | 6/2002 |
| JP | 2003-033021 | 1/2003 |
| JP | 2003-088134 | 3/2003 |
| JP | 2004-037635 | 2/2004 |

* cited by examiner

*Primary Examiner*—Akm E Ullah
*Assistant Examiner*—Harry Behm
(74) *Attorney, Agent, or Firm*—Roylance, Abrams, Berdo & Goodman, L.L.P.

(57) ABSTRACT

A digital high voltage generating apparatus and a method thereof are provided where a switching block controls voltage generated in a second side coil of a power transformer, a digital interface block provides a communication interface, and a digital controlling block controls intermittence of the switching block. The digital controlling block includes a switching section width computing unit for computing a switching section width of the switching block, a frequency counting unit for computing a count value corresponding to a half period of an output voltage of the digital controlling block, and a switching time point determining unit for determining a switching time point of the switching block based on the computed switching section width and the count value. Improved protection of a switch from damage, by a reduction in heat-generation quantity in the switch, is one of the achieved advantages.

22 Claims, 5 Drawing Sheets

APPARATUS AND METHOD FOR GENERATING HIGH VOLTAGE BASED ON DIGITAL CONTROL

CROSS-REFERENCE TO RELATED APPLICATIONS

This application claims the benefit under 35 U.S.C. § 119(a) of a Korean Patent Application No. 2005-63790 filed Jul. 14, 2005, in the Korean Intellectual Property Office, the entire content of which is hereby incorporated by reference.

BACKGROUND OF THE INVENTION

1. Field of the Invention

The present invention relates to an apparatus and method for generating high voltage based on digital control. More particularly, the present invention relates to a high voltage generating apparatus that can generate high voltage by detecting the optimal switching time point, and a high voltage generating method thereof.

2. Description of the Related Art

An image forming device is an apparatus for printing an image corresponding to an inputted original image data on a recording medium such as print paper. Examples of the image forming device include a printer, a photocopier, a facsimile and the like. An electrophotographic method used in the image forming device is adopted by a laser beam printer, a light emitting diode (LED) print head printer, a facsimile and other image forming devices. Electrophotographic image forming devices perform printing operation through charging, light exposure, development, transfer, and fixing.

FIG. 1 is a cross-sectional view showing a conventional electrophotographic image forming device. Referring to FIG. 1, the conventional electrophotographic image forming device includes a photosensitive drum 1, a charging roller 2, a laser scanning unit (LSU) 3, a developing roller 4, a transfer roller 5, a controller 6, and a high-voltage power supply (HVPS) 70.

The printing operation of the electrophotographic image forming device having the above structure will be described hereafter. First, the high-voltage power supply 70 supplies a predetermine level of voltage to the charging roller 2, the developing roller 4 and the transfer roller 5 under the control of the controller 6. The charging roller 2 charges the surface of the photosensitive drum 1 uniformly with the charging voltage supplied from the high-voltage power supply 70. The laser scanning unit 3 scans the photosensitive drum 1 with light corresponding to image data inputted from the controller 6 to thereby form an electrostatic latent image on the surface of the photosensitive drum 1.

Subsequently, a toner image is formed of toner supplied by the developing roller 4 in the electrostatic latent image on the surface of the photosensitive drum 1. The transfer roller 5 driven by a transfer voltage supplied by the high-voltage power supply 70 transfers the toner image formed on the photosensitive drum 1 onto paper for recording. The toner image transferred onto the print paper is fixed on the print paper by heat and pressure supplied from a fixer (not shown) and then gets on an ejection path (not shown) to be ejected outside finally.

As described above, the high voltage generating apparatus 70, which is an essential element of a photocopier, a laser beam printer and a facsimile, transforms a low voltage ranging from 12 to 24V up to high voltage ranging from hundreds to thousands volts in a moment and makes it possible to perform printing by forming high-voltage discharge on the photosensitive drum of a printer or a photocopier. The high voltage generating apparatus 70 senses voltage or current and used as a constant voltage source or a constant current source according to purpose of usage.

FIG. 2 is an exemplary circuit diagram showing a conventional high voltage generating apparatus. Referring to FIG. 2, the conventional high voltage generating apparatus includes a low-pass filter 10, a voltage controller 20, a P2 oscillator, a power transformation unit 30, a voltage distributor 40, a voltage sensor 50, and a protector 60.

When a pulse width modulation (PWM) signal D(t) for determining a level of output voltage based on a duty ratio is inputted from an engine controlling unit, the low-pass filter 10 transforms the inputted signal into a DC signal through an RC two-step filter. The DC signal is used as a reference signal for controlling the output voltage.

The voltage controller 20 functions as a difference circuit and a controller for amplifying an error signal. It compares the DC signal outputted through the low-pass filter 10 with a signal obtained by performing feedback on an actual output voltage and generates a driving signal of a transistor Q in the oscillator and power transformation unit 30.

The oscillator and power transformation unit 30 control the base current quantity of the transistor Q based on the output signal of the voltage controller 20 to thereby fluctuate the voltages in an emitter and a collector of a transistor. In the voltage fluctuation, the voltage of a first side coil in the power transformer is changed and thus voltage is generated in a second side coil of the power transformer having a high turn rate.

The voltage distributor 40 generates a final direct current high voltage from the alternating current voltage generated in the second side coil of the power transformer by using rectifying diodes D1 and D2 and voltage distributing and planarizing capacitors C4 and C5. The voltage sensor 50 and the protector 60 sense actual output voltage, and generate and transmit a feedback signal to the voltage controller 20 to thereby protect the application of an abnormal level of voltage.

FIG. 2 shows a circuit generating high voltage in a development unit of a particular channel in a high-voltage generating apparatus. Different channels are needed to apply a predetermined level of high voltage to the charging roller 2, the developing roller 4, and the transfer roller 5, individually.

However, the conventional high voltage generating apparatus uses an analog control method to precisely control output of each channel individually and thus an error originated from characteristics variance of parts including an RC filter and a voltage controlling part should be corrected.

Also, since many parts are used, it is hard to decrease costs, and defect in an individual part caused by an external factor may lead to malfunction of the entire apparatus. Also, a transistor used as a switch in the oscillator and power transformation unit 30 is operated in a linear area, the transistor always is heated.

In addition, as illustrated in FIG. 2, the conventional voltage generating apparatus uses many parts, it takes a long time to transport and assemble the parts and space for printed circuit board (PCB) on which the parts are to be placed. Since the parts are fixed on the PCB, it is not easy to control the output voltage.

In order to overcome the above-mentioned problems, the conventional high voltage generating apparatus adopts a digital controlling method. However, the High-Voltage Power Supply (HVPS) obtained by making an analog device into an application-specific integrated circuit (ASIC) typically includes a MOSFET and, when the MOSFET performs switching operation in the linear area of the transistor, the switch can be damaged.

SUMMARY OF THE INVENTION

The HVPS ASIC according to an embodiments of the present invention should have a switching circuit topology structure with a small caloric value. For this, it is required to determine an optimized operation time point of a switch. When switching is performed in a section where the voltages at both ends of the switch become the lowest, the caloric value of the switch becomes the minimum and this is the optimized operation time point of the switch.

It is, therefore, an object of the present invention to provide a high voltage generating apparatus that can determine an optimal switching time point, and a high voltage generating method thereof.

In accordance with an exemplary aspect of the present invention, there is provided a high voltage generating apparatus which includes a switching block for controlling voltage generated in a second side coil of a power transformer by intermitting current flowing in a first side coil of the power transformer in connection, a digital interface block for providing a predetermined communication interface, and a digital controlling block for controlling the intermittence operation of the switching block according to control data inputted through the digital interface block. The digital controlling block includes a switching section width computing unit for receiving a reference voltage from the digital interface block and computing a switching section width of the switching block, a frequency counting unit for receiving an output voltage of the digital controlling block and computing a count value corresponding to a half period of the output voltage, and a switching time point determining unit for determining a switching time point of the switching block based on the computed switching section width and the count value of the output voltage.

According to an exemplary implementation of the present invention, the switching section is a minimum value section of the generated voltage.

Also, the switching section width computing unit may receive a feedback signal of the generated voltage and compute the switching section width based on the feedback signal.

According to an exemplary implementation of the present invention, the switch-on time of the switching time point is computed based on an equation expressed as:

$$T_{on}=1.5*T_r-0.5*T_{eff}$$

where Tr denotes a half period of output voltage and Teff denotes a switching section width.

Also, the switch-off time of the switching time point is computed based on an equation expressed as:

$$T_{off}=1.5*T_r+0.5*T_{eff}$$

where $T_r$ denotes a half period of output voltage and $T_{eff}$ denotes a switching section width.

According to an exemplary implementation of the present invention, the switching block, the digital interface block and the digital controlling block are embodied within an Application-Specific Integrated Circuit (ASIC) chip.

According to an exemplary implementation of the present invention, the switching block uses a Mono-Oxide Semiconductor Field Effect Transistor (MOSFET) as a switch for intermittence operation.

In accordance with another exemplary aspect of the present invention, there is provided an image forming device having a high voltage generating apparatus to generate voltage, which includes a switching block for controlling voltage generated in a second side coil of a power transformer by intermitting current flowing in a first side coil of the power transformer in connection, a digital interface block for providing a predetermined communication interface, and a digital controlling block for controlling the intermittence operation of the switching block according to control data inputted through the digital interface block. The digital controlling block includes a switching section width computing unit for receiving a reference voltage from the digital interface block and computing a switching section width of the switching block, a frequency counting unit for receiving an output voltage of the digital controlling block and computing a count value corresponding to a half period of the output voltage, and a switching time point determining unit for determining a switching time point of the switching block based on the computed switching section width and the count value corresponding to a half period of the output voltage.

In accordance with another exemplary aspect of the present invention, there is provided a method for generating high voltage in a high voltage generating apparatus having a switching block, a digital interface block and a digital controlling block. The method includes the steps of: a) receiving a reference voltage from the digital interface block and computing a switching section width of the switching block; b) receiving an output voltage of the digital controlling block and computing a count value corresponding to a half period of the output voltage; and c) determining a switching time point of the switching block based on the computed switching section width and the count value corresponding to a half period of the output voltage, wherein the switching block controls voltage generated in a second side coil of a power transformer by intermitting current flowing in a first side coil of the power transformer in connection, and the digital interface block provides a predetermined communication interface, while the digital controlling block controls intermittence operation of the switching block according to control data inputted through the digital interface block.

According to an exemplary implementation of the present invention, the switching section is a minimum value section of the generated voltage.

According to an exemplary implementation of the present invention, the method further includes d) receiving a feedback signal of the generated voltage and computing the switching section width based on the feedback signal.

According to an exemplary implementation of the present invention, the switch-on time of the switching time point is computed based on an equation expressed as:

$$T_{on}=1.5*T_r-0.5*T_{eff}$$

where $T_r$ denotes a half period of output voltage and $T_{eff}$ denotes a switching section width.

According to an exemplary implementation of the present invention, the switch-off time of the switching time point is computed based on an equation expressed as:

$$T_{off}=1.5*T_r+0.5*T_{eff}$$

where $T_r$ denotes a half period of output voltage and $T_{eff}$ denotes a switching section width.

According to an exemplary implementation of the present invention, the steps a) to d) are embodied within an ASIC chip.

According to an exemplary implementation of the present invention, the switching block uses a MOSFET as a switch for intermittence operation.

In accordance with another exemplary aspect of the present invention, there is provided an image forming device which generates voltage in a high voltage generating apparatus having a switching block, a digital interface block and a digital controlling block through a high voltage generating method. The method comprises: a) receiving a reference voltage from the digital interface block and computing a switching section width of the switching block; b) receiving an output voltage of the digital controlling block and computing a count value corresponding to a half period of the output voltage; and c) determining a switching time point of the switching block based on the computed switching section width and the count value corresponding to a half period of the output voltage. The switching block controls voltage generated in a second side coil of a power transformer by intermitting current flowing in a first side coil of the power transformer in connection, and the digital interface block provides a predetermined communication interface, while the digital controlling block controls intermittence operation of the switching block according to control data inputted through the digital interface block.

In accordance with another exemplary aspect of the present invention, there is provided an ASIC chip realized in one semiconductor substrate. The ASIC chip comprises a switching block for controlling voltage generated in a second side coil of a power transformer by intermitting current flowing in a first side coil of the power transformer in connection, a digital interface block for providing a predetermined communication interface, and a digital controlling block for controlling the intermittence operation of the switching block according to control data inputted through the digital interface block. The digital controlling block includes a switching section width computing unit for receiving a reference voltage from the digital interface block and computing a switching section width of the switching block, a frequency counting unit for receiving an output voltage of the digital controlling block and computing a count value corresponding to a half period of the output voltage, and a switching time point determining unit for determining a switching time point of the switching block based on the computed switching section width and the count value of the output voltage.

According to an exemplary implementation of the present invention, the switching section is a minimum value section of the generated voltage.

According to an exemplary implementation of the present invention, the switching section width computing unit receives a feedback signal of the generated voltage and computes the switching section width based on the feedback signal.

According to an exemplary implementation of the present invention, the switch-on time of the switching time point is computed based on an equation expressed as:

$$T_{on} = 1.5 * T_r - 0.5 * T_{eff}$$

where $T_r$ denotes a half period of output voltage and $T_{eff}$ denotes a switching section width.

According to an exemplary implementation of the present invention, the switch-off time of the switching time point is computed based on an equation expressed as:

$$T_{off} = 1.5 * T_r + 0.5 * T_{eff}$$

where $T_r$ denotes a half period of output voltage and $T_{eff}$ denotes a switching section width.

According to an exemplary implementation of the present invention, the switching block uses a MOSFET as a switch for intermittence operation.

BRIEF DESCRIPTION OF THE DRAWINGS

The above aspects and features of the present invention will be more apparent by describing certain embodiments of the present invention with reference to the accompanying drawings, in which like reference numerals will be understood to refer to like parts, components and structures, where.

DETAILED DESCRIPTION OF EXEMPLARY EMBODIMENTS

Figure 1:
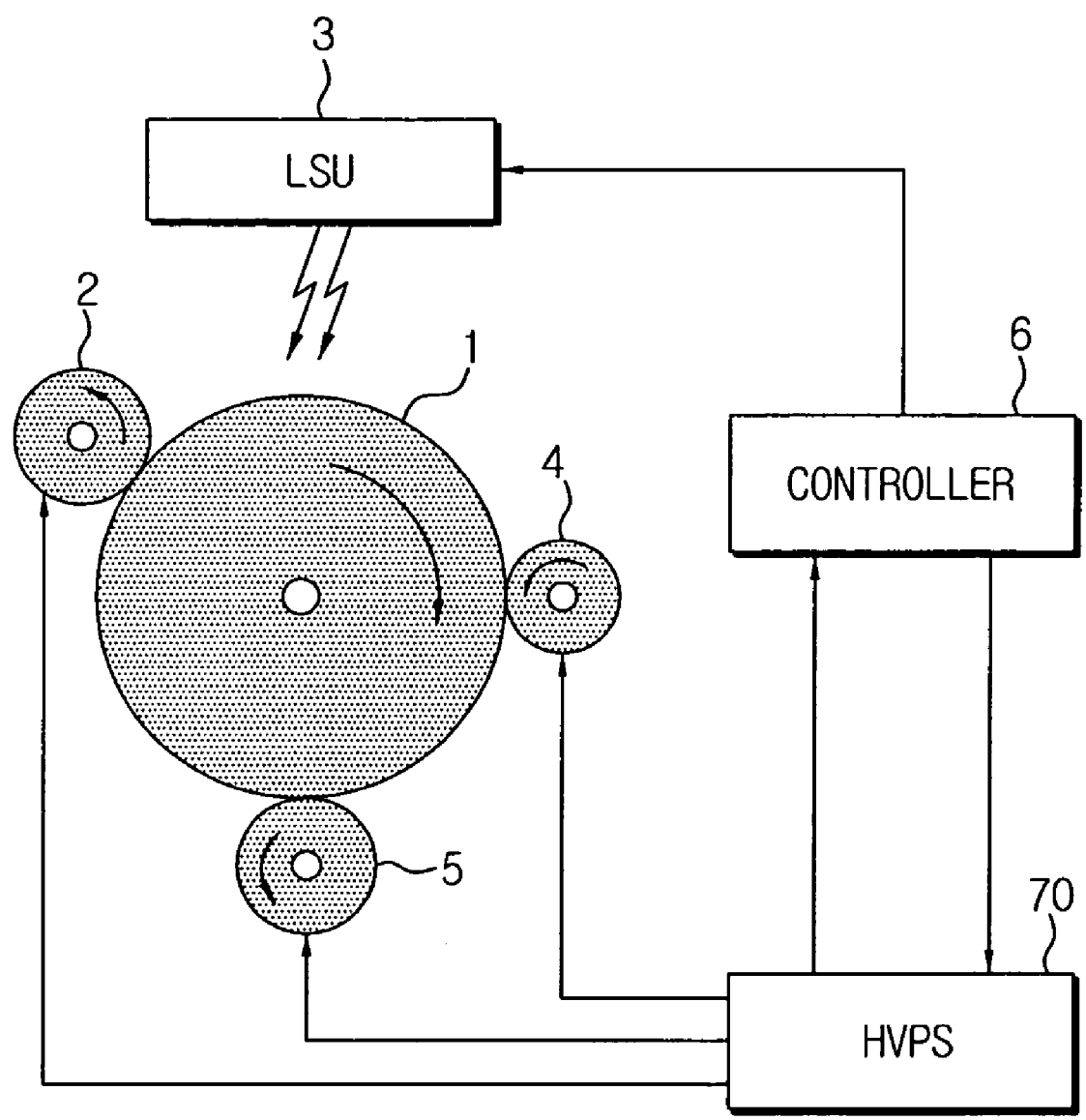
FIG. 1 is a cross-sectional view showing a conventional image forming device.
Figure 2:
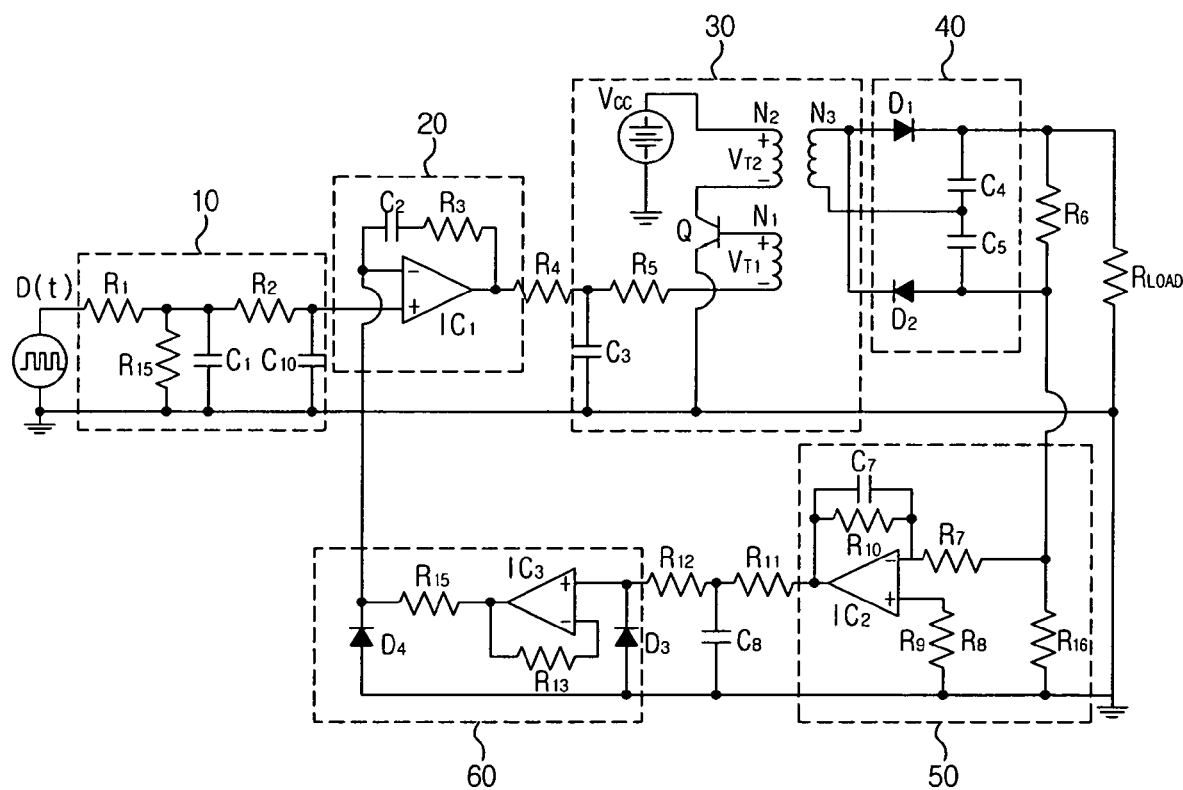
FIG. 2 is an exemplary circuit diagram showing a conventional high voltage generating apparatus.

Certain exemplary embodiments of the present invention will be described in greater detail with reference to the accompanying drawings.

In the following description, as noted above, same drawing reference numerals are used for the same elements throughout the drawings. The matters defined in the description such as a detailed construction and elements are exemplary, and are provided to assist in a comprehensive understanding of the invention but do not in any way limit the scope thereof. Thus, it is apparent that various implementations of the present invention are possible without departing from the scope and spirit of the invention. Also, well-known functions or constructions are not described in detail for clarity and conciseness.

Figure 3:
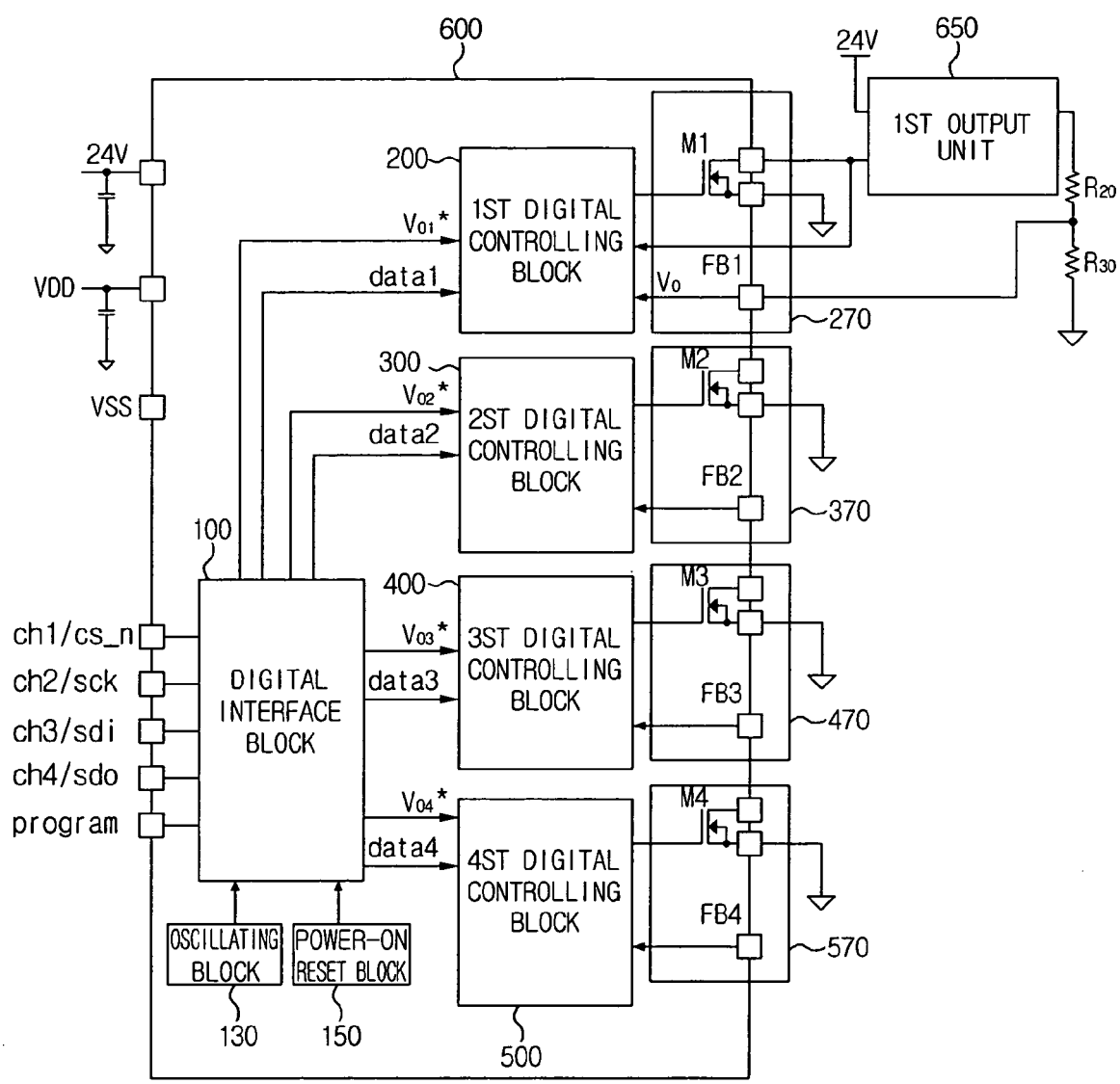
FIG. 3 is a block diagram showing a high voltage generating apparatus in accordance with an exemplary embodiment of the present invention.

FIG. 3 is a block diagram showing a high voltage generating apparatus in accordance with an exemplary embodiment of the present invention. Referring to FIG. 3, the high voltage generating apparatus includes a digital interface block 100, an oscillating block 130, a power-on reset block 150, first to fourth digital controlling blocks 200, 300, 400 and 500, first to fourth switching blocks 270, 370, 470 and 570. The digital interface block 100, the oscillating block 130, the power-on reset block 150, the first to fourth digital controlling blocks 200, 300, 400 and 500, the first to fourth switching blocks 270, 370, 470 and 570 are embodied in one ASIC chip.

Each of the first to fourth switching blocks 270, 370, 470 and 570 is connected to an output unit having a power transformer and a power distribution circuit. FIG. 3 shows a case where a first output unit 650 is connected only to the first switching block 270 for clarity and conciseness of explanation.

The digital interface block 100 receives control data for controlling the waveform and intensity of output voltage from an engine controlling unit. The control data can have a data format of Pulse Width Modulation (PWM) in which the level of output voltage is determined based on a duty ratio, Universal Asynchronous Receiver/Transmitter (UART), Serial Peripheral Interface (SPI) in which data are exchanged between two devices through serial communication, or serial communication interface such as interactive serial bus I2C.

The digital interface block 100 transforms the format of the control data transmitted from the engine controlling unit into a predetermined format, and transmits the control data to the first to fourth digital controlling blocks 200, 300, 400 and 500 to be used as time constants data1, data2, data3 and data4 for determining the waveform of output voltage and control reference voltage values V011*, V02*, V032* and V044* for determining the intensity of output voltage.

The first to fourth digital controlling block 200, 300, 400 and 500 have the same structure and the same functions. They compare each of the control reference voltage values V011*, V02*, V032* and V044* transmitted from the digital interface block 100 with a signal ($V_o$) obtained by sensing an actual output voltage of each channel and performing feedback. Then, they use the signal ($V_o$) as an operation signal of a switch corresponding to the first to fourth switching block 270, 370, 470 an 570 based on the comparison result.

The first to fourth switching blocks 270, 370, 470 and 570 are also provided on the ASIC chip and they use Mono-Oxide Semiconductor Field Effect Transistor (MOSFET) M1, M2, M3 and M4 as switches. The first to fourth switching blocks 270, 370, 470 and 570 are formed to control voltage flowing through a first side coil of the power transformer connected in serial to a drain by being turned on/off, as the operation signals outputted from the first to fourth digital controlling blocks 200, 300, 400 and 500 are applied to gates of the MOSFETs. The use of the MOSFETs instead of transistors reduces or eliminates the need for a heat-radiating plate for preventing transistors from heating.

The first output unit 650 includes the power transformer, a voltage distributor, and a rectifier. The voltage distributor is connected to a switch in serial and it is formed to be oscillated in serial according to on/off operation of the switch and generate an alternating current (AC) signal. Accordingly, AC voltage having a high electric potential is generated in the second side coil of the power transformer.

The power distributor and rectifier rectify and use the AC voltage generated in the second side coil of the power transformer based on the output voltage range, or they raise the voltage through a voltage multiplication circuit and use the raised final output voltage. The high voltage generating apparatus 600 includes the oscillating block 130, which is a clock generator, and the power-on reset block 150 for supplying a reset signal when power is applied. The power applied to the high voltage generating apparatus 600 is formed to provide 24V power for providing high voltage and VDD for operating an Integrated Circuit (IC).

The high voltage generating apparatus having the above-described structure generates high voltage by controlling the output unit of each channel according to the control data transmitted from the engine controlling unit.

Figure 4:
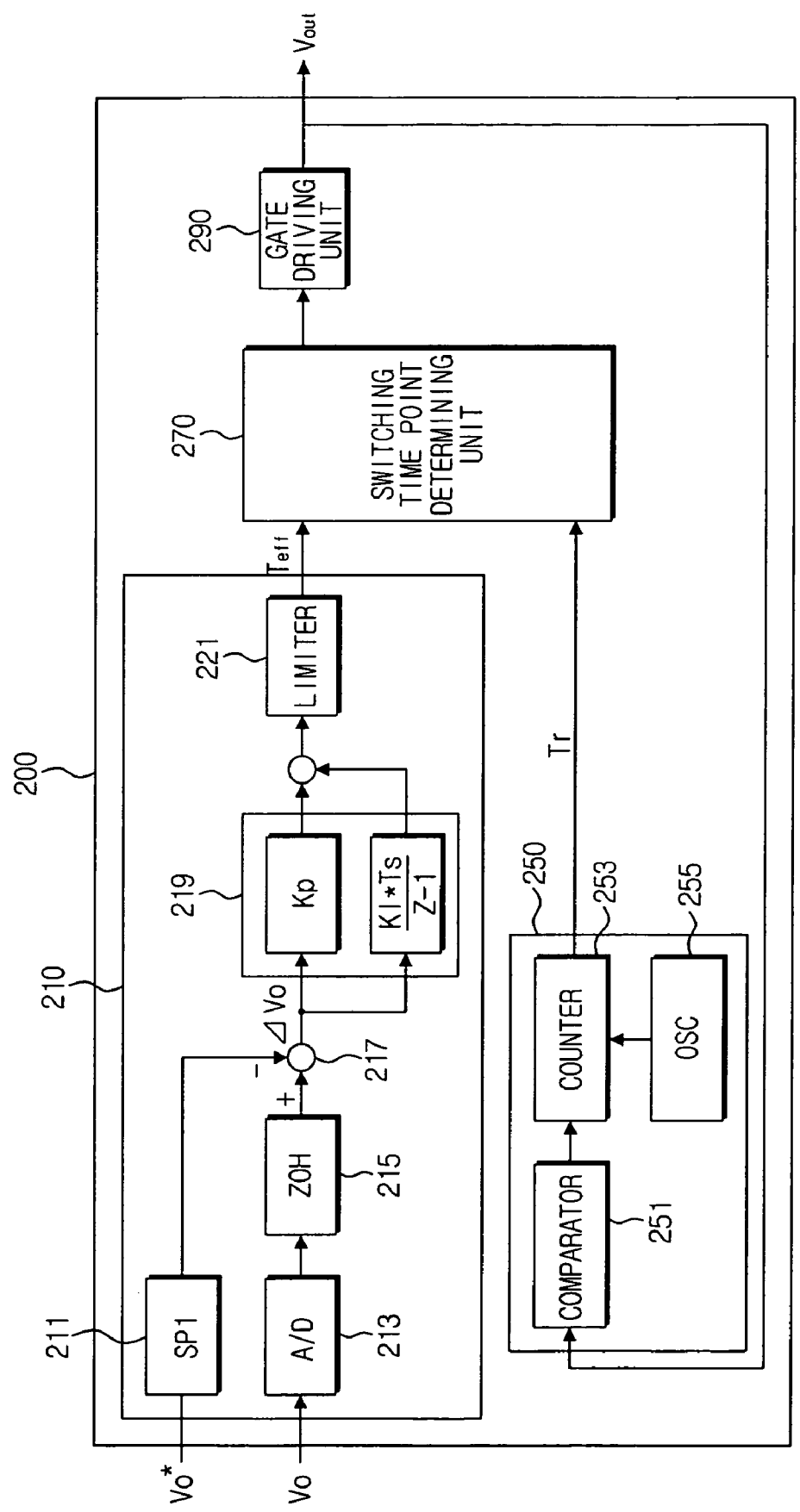
FIG. 4 is a block diagram illustrating an exemplary implementation of a first digital controlling block of FIG. 3.
Figure 5:
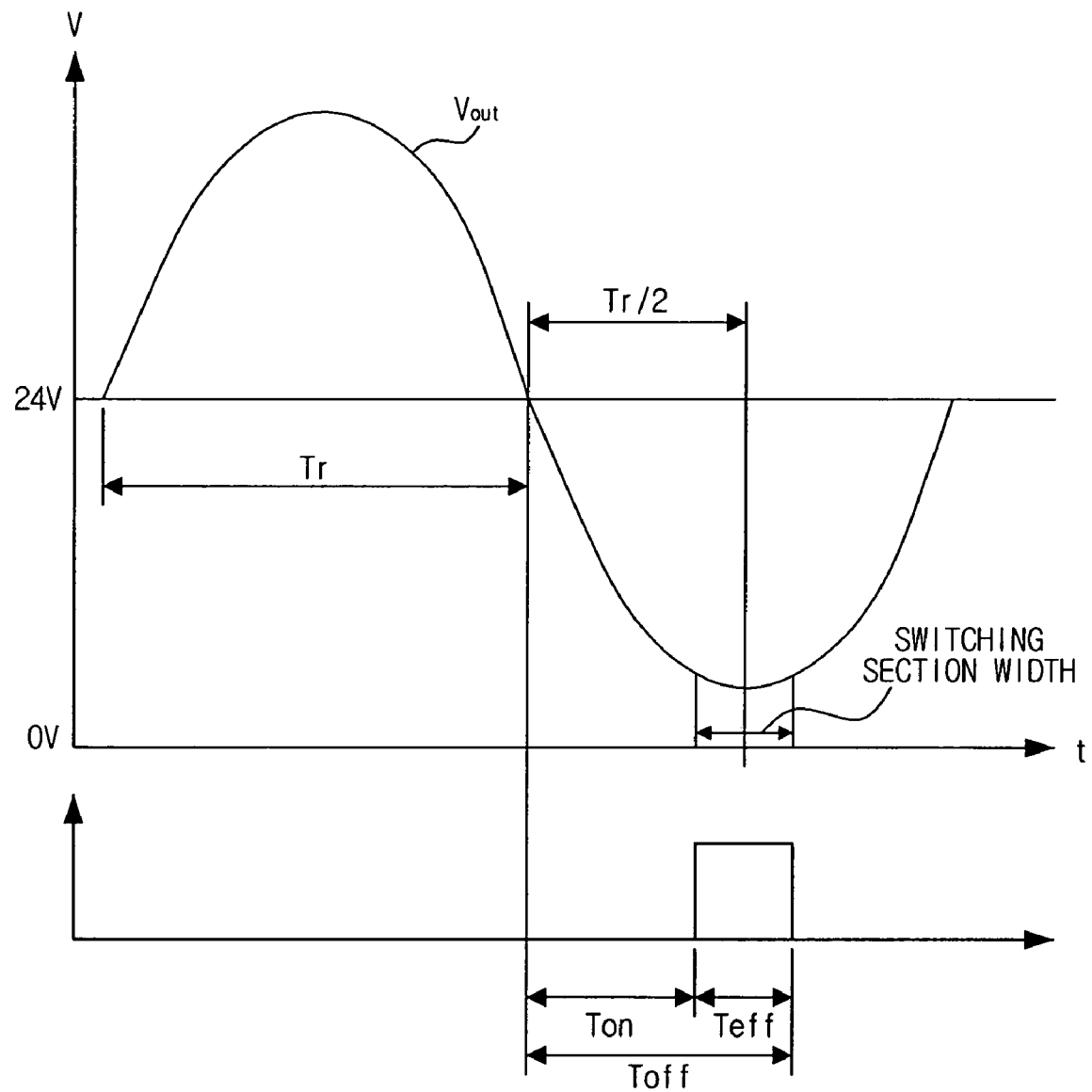
FIG. 5 is a graph describing a principle of determining an optimal switching time point in the first digital controlling block in accordance with an exemplary embodiment of the present invention.

FIG. 4 is a block diagram illustrating the first digital controlling block of FIG. 3. FIG. 5 is a graph describing a principle of determining an optimal switching time point in the first digital controlling block in accordance with an embodiment of the present invention.

The waveform of FIG. 5 shows variation of voltages at both ends of the switch of the first switching block 270 along a time axis. The voltages have sinusoid voltage characteristics with a regular frequency through an oscillator circuit.

Referring to FIGS. 4 and 5, the principle of determining an optimal switching time point in the first digital controlling block 200 will be described in accordance with an embodiment of the present invention. The first digital controlling block 200 includes a switching section width computing unit 210, a frequency counting unit 250, a switching time point determining unit 290, and a gate driving unit 290. The switching section width computing unit 210 includes an SPI 211, an A/D 213, a ZOH 215, an adder 217, a PI controller 219, and a limiter 221.

The frequency counting unit 250 includes a comparator 251, a counter 253, and an OSC 255.

The SPI 211, A/D 213, ZOH 215 and adder 217 of the switching section width computing unit 210 compare the control reference voltage value ($V_o^*$) transmitted form the digital interface block 100 with the voltage ($V_o$) obtained by performing feedback on an actual output voltage, and transmit the comparison result to the PI controller 219.

The PI controller 219 controls output voltage into a predetermined level. It compares the control reference voltage value ($V_o^*$) with the voltage ($V_o$) obtained by performing feedback on an actual output voltage, and computes a switching section width ($T_{eff}$) based on the comparison result.

According to an exemplary implementation of the present invention, the switching section width is the lowest voltage section of the sinusoid waveform shown in FIG. 5. When switching is carried out in the lowest voltage section, the heat generation quantity of the switch is reduced so as to obtain the minimum switching loss.

The output voltage value of the first digital controlling block 200 can be defined as a switching section width ($T_{eff}$), which is a valid time that the switch performs switching.

The comparator 251 of the frequency counting unit 250 detects voltages at both ends of the MOSFET, which is used as a switch, to thereby detect a zero crossing status. In an exemplary embodiment, the voltage at the zero crossing status is 24V.

Also, the counter 253 computes a count value from the zero crossing status detected in the comparator 251 until the initial zero crossing status comes again. The count value computed in the counter 253 corresponds to a half period ($T_r$) of output voltage ($V_{out\_x}$) of the first digital controlling block 200.

Subsequently, the count value corresponding to the half period ($T_r$) computed in the counter is transmitted to the switching time point determining unit 290. The switching time point determining unit 290 computes actual switching on/off time in the first switching block 270 based on the switching section width ($T_{eff}$) transmitted from the switching section width computing unit 210 and the count value corresponding to the half period ($T_r$) of the output voltage ($V_{out\_x}$) transmitted from the frequency counting unit 250. The computation in the switching time point determining unit 290 is shown in the following Equations 1 and 2:

$$T_{on}=1.5*T_r-0.5*T_{eff} \qquad \text{Equation 1}$$

$$T_{off}=1.5*T_r+0.5*T_{eff} \qquad \text{Equation 2}$$

where $T_r$ denotes a half period of output voltage and $T_{eff}$ denotes switching section width.

To explain the computation in the switching time point determining unit 290 based on the Equations 1 and 2, time for reaching the lowest point of the sinusoid where the intensity of the output voltage ($V_{out\_x}$) is the lowest based on 24V is obtained by multiplying 1.5 by the half period ($T_r$) of the output voltage ($V_{out\_x}$) from the first digital controlling block 200.

When a value obtained by multiplying 0.5 by the switching section width ($T_{eff}$) which is valid time that the switch performs switching is subtracted from the time for reaching the lowest point of the sinusoid, time '$T_{ON}$' corresponding to actual switching 'on' in the first switching block 270 is computed. When the value obtained by multiplying 0.5 by the switching section width ($T_{eff}$) which is valid time that the switch performs switching is added to the time for reaching the lowest point of the sinusoid, time '$T_{OFF}$' corresponding to actual switching 'off' in the first switching block 270 is computed.

The switching time point determining unit 290 generates a PWM-type gate signal ($V_{out\_x}$) to be applied to a gate of the MOSFET, which is used as a switch, based on the above-calculated '$T_{ON}$' and '$T_{OFF}$'.

Meanwhile, the second to fourth digital controlling blocks 300, 400 and 500 have the same structure and functions as those of the first digital controlling block 200.

As described above, the switch can be protected from damage by reducing the heat generation quantity in the switch in accordance with the exemplary embodiment of the present invention. Also, since a switching time point is set up by directly detecting voltages at both ends of the switch, a more optimal switching section can be established even when there is fluctuation in load. Also, the high voltage generating apparatus according to exemplary embodiments of the present invention has a simpler circuit than a conventional PWM generation circuit based on carrier comparison and it can determine an accurate switching time point.

The foregoing embodiment and advantages are merely exemplary and are not to be construed as limiting the scope of the present invention. The present teaching can be readily applied to other types of apparatuses. Thus, the description of the exemplary embodiments of the present invention is intended to be illustrative, and not to limit the scope of the invention which is defined in the appended claims and their equivalents. Many alternatives, modifications, and variations will be apparent to those skilled in the art.

What is claimed is:

1. A high voltage generating apparatus comprising:
   a switching block for controlling a voltage generated in a second side coil of a power transformer by intermitting a current flowing in a first side coil of the power transformer;
   a digital interface block for providing a communication interface; and
   a digital controlling block for controlling the intermitting of the switching block according to control data input through the digital interface block,
   wherein the digital controlling block comprises:
      a switching section width computing unit for receiving a reference voltage from the digital interface block and computing a switching section width of the switching block;
      a frequency counting unit for receiving an output voltage of the digital controlling block and computing a count value corresponding to a half period of the output voltage; and
      a switching time point determining unit for determining a switching time point of the switching block based on the computed switching section width and the computed count value.

2. The apparatus as claimed in claim 1, wherein the switching section comprises a minimum value section of the generated voltage.

3. The apparatus as claimed in claim 1, wherein the switching section width computing unit receives a feedback signal of the generated voltage and computes the switching section width based on the feedback signal.

4. The apparatus as claimed in claim 1, wherein determining a switch-on time of the switching time point comprises computing based on an equation:

$$T_{on}=1.5*T_r-0.5*T_{eff}$$

where $T_r$ denotes a half period of output voltage and $T_{eff}$ denotes a switching section width.

5. The apparatus as claimed in claim 1, wherein determining a switch-off time of the switching time point comprises computing based on an equation:

$$T_{off}=1.5*T_r+0.5*T_{eff}$$

where $T_r$ denotes a half period of output voltage and $T_{eff}$ denotes a switching section width.

6. The apparatus as claimed in claim 1, wherein an Application-Specific Integrated Circuit (ASIC) chip comprises at least one of the switching block, the digital interface block and the digital controlling block are embodied.

7. The apparatus as claimed in claim 1, wherein the switching block comprises a Mono-Oxide Semiconductor Field Effect Transistor (MOSFET) as a switch for intermitting.

8. An image forming device comprising the high voltage generating apparatus as claimed in claim 1.

9. A method for generating high voltage, the method comprising:
   first receiving a reference voltage from a digital interface block of a high voltage generating apparatus;
   first computing a switching section width of a switching block of the high voltage generating apparatus;
   second receiving an output voltage of a digital controlling block of the high voltage generating apparatus;
   second computing a count value corresponding to a half period of the output voltage; and
   determining a switching time point of the switching block based on the computed switching section width and the computed count value;
   wherein the switching block controls voltage generated in a second side coil of a power transformer by intermitting current flowing in a first side coil of the power transformer, the digital interface block provides a communication interface, and the digital controlling block controls intermittence operation of the switching block according to control data input through the digital interface block.

10. The method as claimed in claim 9, wherein the switching section comprises a minimum value section of the generated voltage.

11. The method as claimed in claim 9, further comprising third receiving a feedback signal of the generated voltage and computing the switching section width based on the feedback signal.

12. The method as claimed in claim 9, wherein computing of a switch-on time of the switching time point comprises computing based on an equation:

$$T_{on}=1.5*T_r-0.5*T_{eff}$$

where $T_r$ denotes a half period of output voltage and $T_{eff}$ denotes a switching section width.

13. The method as claimed in claim 9, wherein computing of a switch-off time of the switching time point comprises computing based on an equation:

$$T_{off}=1.5*T_r+0.5*T_{eff}$$

where $T_r$ denotes a half period of output voltage and $T_{eff}$ denotes a switching section width.

14. The method as claimed in claim 9, wherein an Application-Specific Integrated Circuit (ASIC) chip is configured to perform at least one of the first receiving, the second receiving, the first computing, the second computing and the determining.

15. The method as claimed in claim 9, wherein the intermitting comprises using a Mono-Oxide Semiconductor Field Effect Transistor (MOSFET) as a switch in the switching block.

16. A method for forming images by an image forming device, the method comprising the generating of the high voltage as claimed in claim 9.

17. An Application-Specific Integrated Circuit (ASIC) chip on a semiconductor substrate, the ASIC comprising:
   a switching block for controlling a voltage generated in a second side coil of a power transformer by intermitting a current flowing in a first side coil of the power transformer in connection;
   a digital interface block for providing a communication interface; and
   a digital controlling block for controlling the intermitting of the switching block according to control data input through the digital interface block,
   wherein the digital controlling block comprises:
      a switching section width computing unit for receiving a reference voltage from the digital interface block and computing a switching section width of the switching block;
      a frequency counting unit for receiving an output voltage of the digital controlling block and computing a count value corresponding to a half period of the output voltage; and
      a switching time point determining unit for determining a switching time point of the switching block based on the computed switching section width and the computed count value.

18. The ASIC chip as claimed in claim 17, wherein the switching section comprises a minimum value section of the generated voltage.

19. The ASIC chip as claimed in claim 17, wherein the switching section width computing unit receives a feedback signal of the generated voltage and computes the switching section width based on the feedback signal.

20. The ASIC chip as claimed in claim 17, wherein determining a switch-on time of the switching time point comprises computing based on an equation:

$$T_{on}=1.5*T_r-0.5*T_{eff}$$

where $T_r$ denotes a half period of output voltage and $T_{eff}$ denotes a switching section width.

21. The ASIC chip as claimed in claim 17, wherein determining a switch-off time of the switching time point comprises computing based on an equation:

$$T_{off}=1.5*T_r+0.5*T_{eff}$$

where $T_r$ denotes a half period of output voltage and $T_{eff}$ denotes a switching section width.

22. The ASIC chip as claimed in claim 17, wherein the switching block comprises a Mono-Oxide Semiconductor Field Effect Transistor (MOSFET) as a switch for the intermitting.

* * * * *